May 19, 1925.
G. A. BUTTRESS
MACHINE FOR CUTTING PLASTER BOARD
Filed Nov. 21, 1921
1,538,086
4 Sheets-Sheet 1
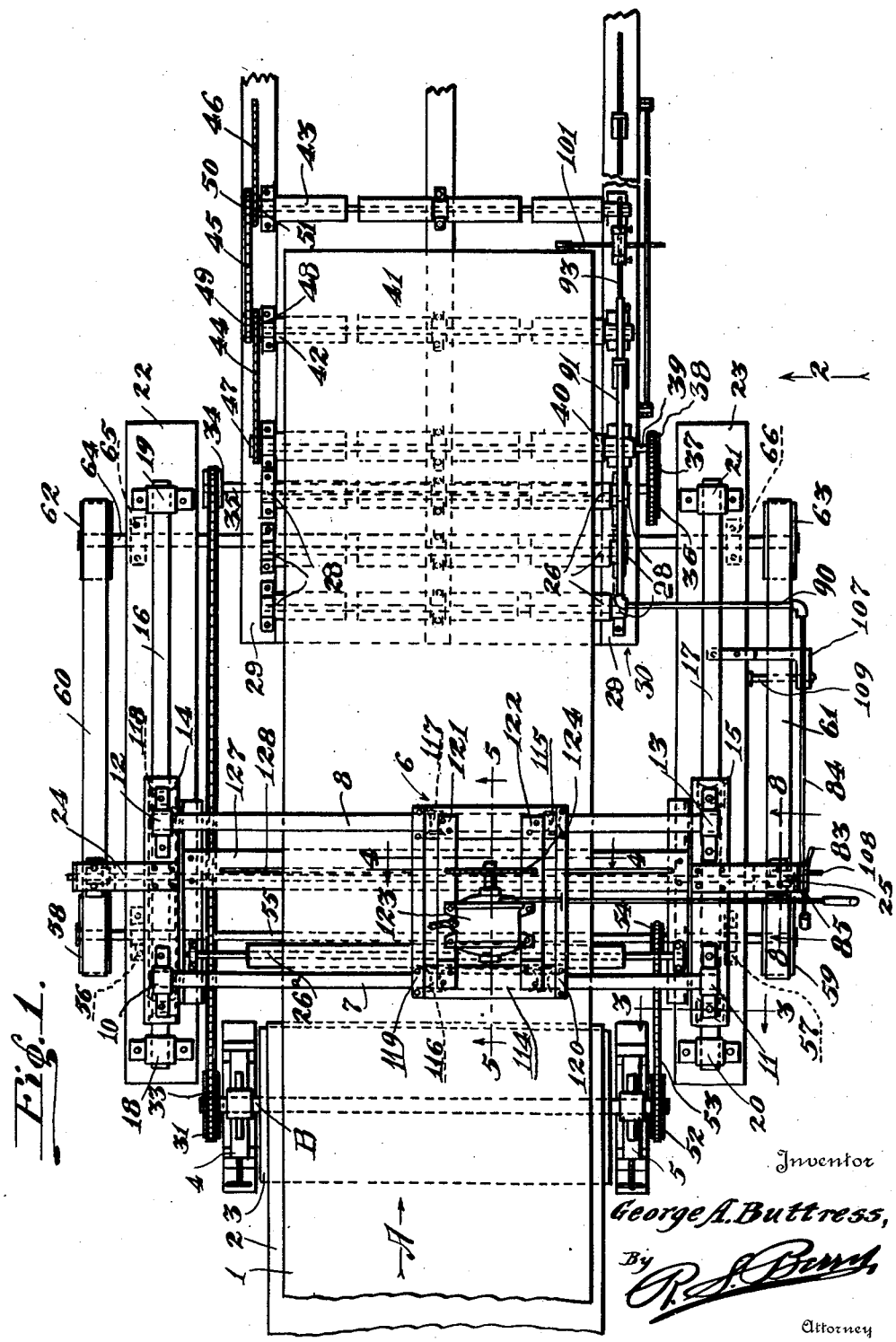

May 19, 1925.
G. A. BUTTRESS
1,538,086
MACHINE FOR CUTTING PLASTER BOARD
Filed Nov. 21, 1921
4 Sheets-Sheet 2
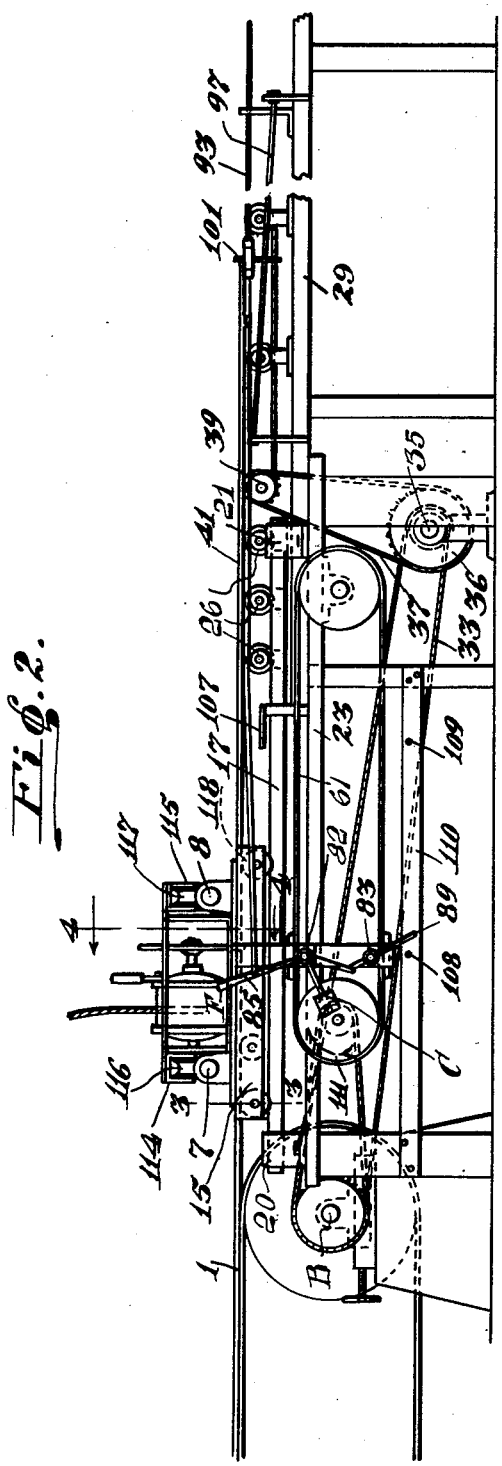
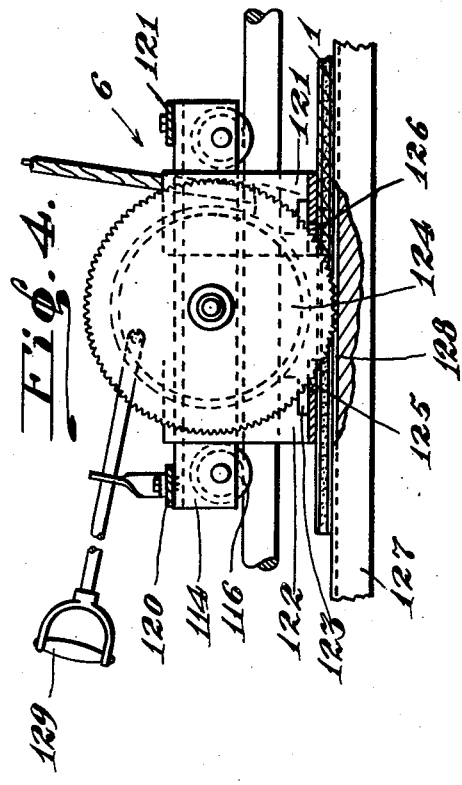
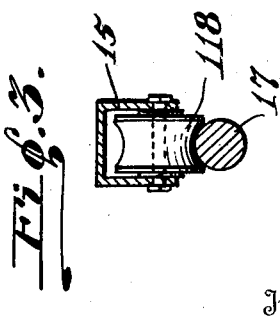
Inventor
George A. Buttress,
By R. S. Berry
Attorney May 19, 1925.  
G. A. BUTTRESS  
1,538,086  
MACHINE FOR CUTTING PLASTER BOARD  
Filed Nov. 21, 1921  
4 Sheets-Sheet 3
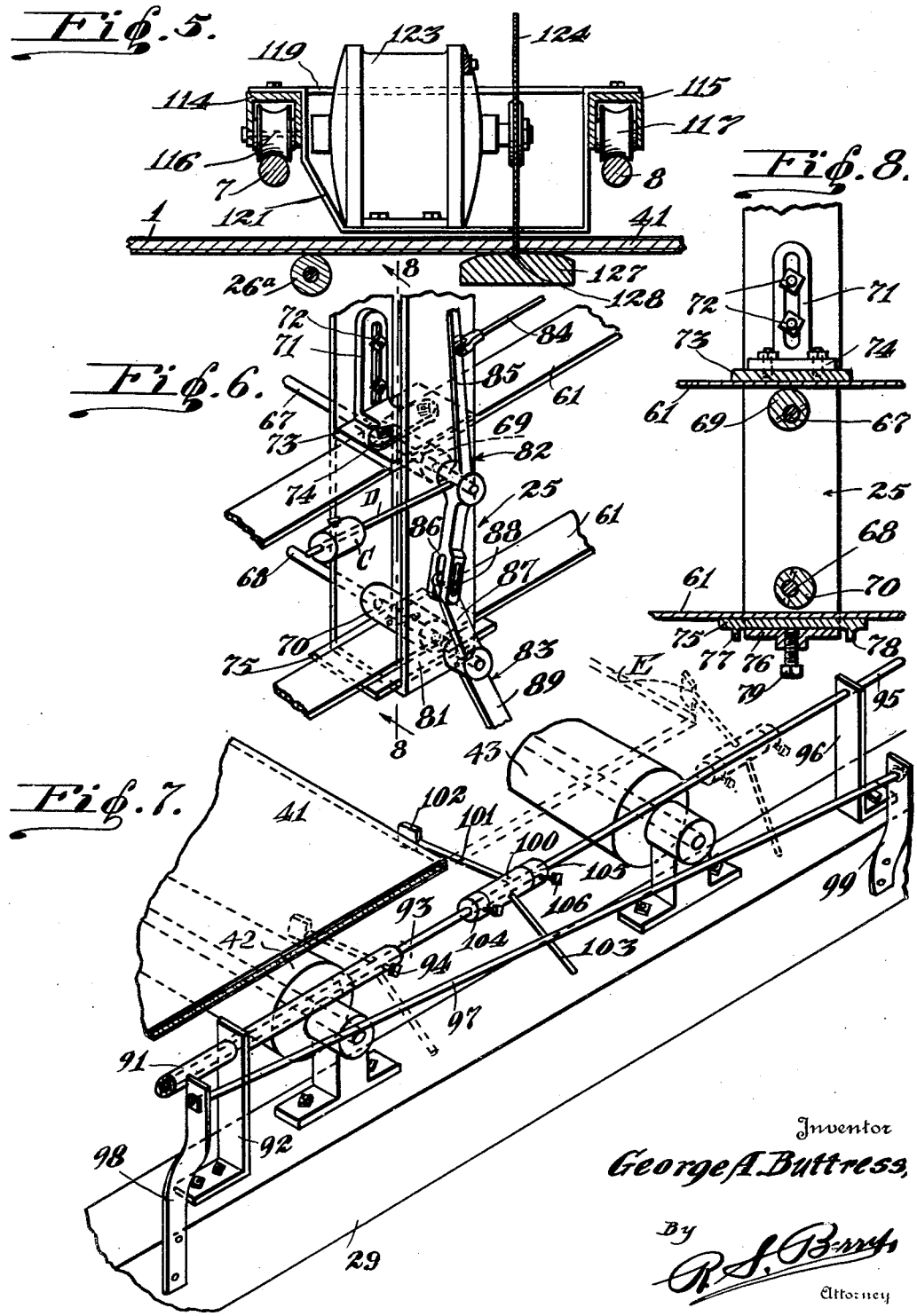

May 19, 1925.
G. A. BUTTRESS
1,538,086
MACHINE FOR CUTTING PLASTER BOARD
Filed Nov. 21, 1921    4 Sheets-Sheet 4
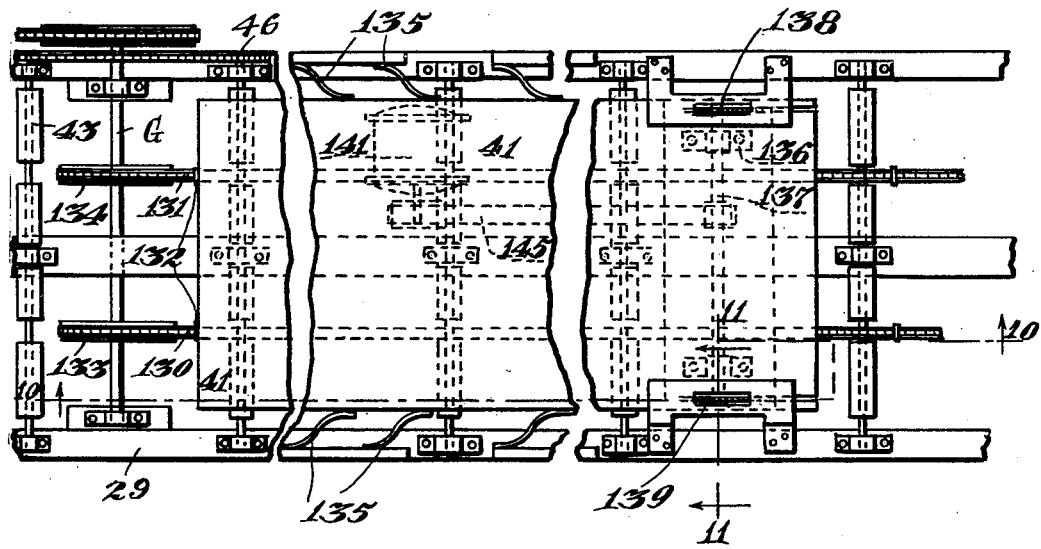
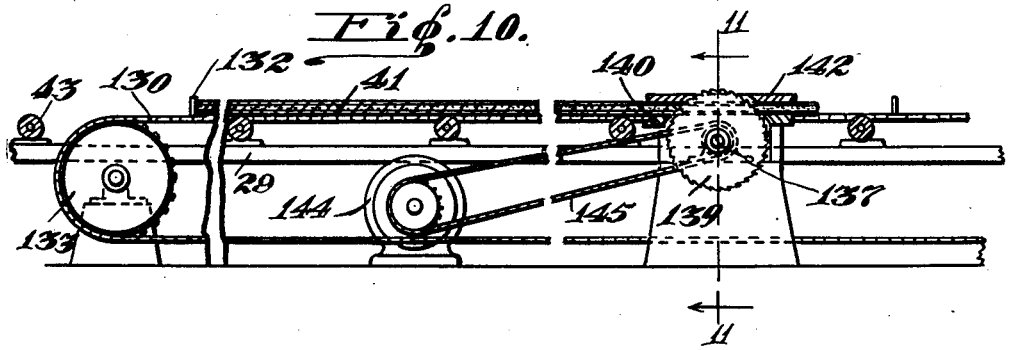
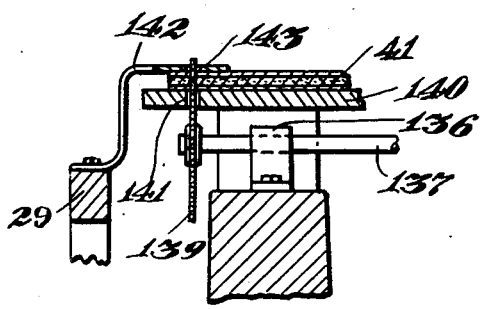

Patented May 19, 1925.

1,538,086

UNITED STATES PATENT OFFICE.

GEORGE A. BUTTRESS, OF LOS ANGELES, CALIFORNIA, ASSIGNOR TO BUTTRESS MANUFACTURING COMPANY, A CORPORATION OF CALIFORNIA.

MACHINE FOR CUTTING PLASTER BOARD.

Application filed November 21, 1921. Serial No. 516,768.

*To all whom it may concern:*

Be it known that I, GEORGE A. BUTTRESS, a citizen of the United States, residing at Los Angeles, in the county of Los Angeles and State of California, have invented new and useful Improvements in Machines for Cutting Plaster Board, of which the following is a specification.

My invention relates to a machine for cutting plaster-board into proper lengths without retarding or stopping the progress of the plaster-board approaching and passing through the said machine.

An object is to construct the machine so that the lengths of the plaster-board will be measured very accurately.

Another object is to provide means whereby the movement of the cutting mechanism will be automatically set so as to travel with and at the same speed at which the plaster-board is traveling.

A further object is to provide a carriage having a saw mounted thereon for cutting at right angles to the direction in which the plaster-board is traveling.

A still further object of this mechanism is the trimming of the lengthwise sides of the plaster-board.

In carrying out my invention I employ a mechanism located at the end of a plaster board conveyor to which mechanism a strip of plaster board is delivered continuously in a horizontal position, and which mechanism acts on the plaster board while the latter is in motion, first, to cut the strip of plaster board into sections of predetermined lengths, and thereafter trim the sections along their longitudinal edges to form them of uniform width. The mechanism embodies an adjustable means for automatically measuring the lengths of the plaster board sections which is adapted to be set so that a cutting mechanism may be operated to transversely sever a section of any desired length from the plaster board strip. In the embodiment of the invention as herein set forth the transverse cutting mechanism is mechanically advanced with the board but is manually moved transversely of the board while advancing. The invention further embodies mechanism controlled by the measuring device for automatically effecting advance and retrograde movement of the board-severing means along the line of travel of the plaster board.

The machine embodying my invention will be hereinafter more fully set forth, pointed out in the claims and illustrated in the accompanying drawings, in which:

Figure 1 is a plan view of the mechanism for cutting the plaster board into sections of predetermined lengths while being advanced.

Fig. 2 is a view in side elevation as seen in the direction indicated by the arrow 2 in Fig. 1.

Fig. 3 is a cross section on the lines 3—3 of Figs. 1 and 2.

Fig. 4 is a cross section on the lines 4—4 of Figs. 1 and 2.

Fig. 5 is a cross section on the lines 5—5 of Fig. 1.

Fig. 6 is a perspective of the clutching mechanism.

Fig. 7 is a perspective of the measuring device.

Fig. 8 is a cross section on the lines 8—8 of Figs. 1 and 6.

Fig. 9 is a plan of the machine which trims the lengthwise sides of the plaster-board.

Fig. 10 is a side elevation and taken on the lines 10—10 of Fig. 9.

Fig. 11 is a cross section taken on the lines 11—11 of Figs. 9 and 10.

More specifically, reference being had to Figure 1, 1 indicates a strip of plaster board supported on a conveyor belt 2 and adapted to be advanced continuously by the latter in the direction indicated by the arrow A. The belt 2 passes around a drum 3 carried on a shaft B mounted in suitable bearings 4 and 5. A saw carriage 6 is mounted to travel on tracks 7 and 8 arranged transversely above the plaster board adjacent the drum 3; the tracks 7 and 8 being supported on standards 10, 11, 12 and 13 on carriers 14 and 15 having wheels 118 mounted to travel on rails 16 and 17 extending parallel to the line of travel of the plaster board in such manner that when the carriers are moved longitudinally of the rails the saw carriage 6 will be moved longitudinally of the plaster board.

The rail 16 is carried on standards 18 and 19, and the rail 17 is carried on standards 20 and 21; the standards 18 and 19 being supported on a base 22, and the standards 20 and 21 being supported on a base 23.

The carrier 14 supports a frame 24 and the carrier 15 supports a frame 25; the frames 24 and 25 carrying mechanism by which the carriers may be operatively connected to a carriage-advancing and retracting mechanism, as will be later described.

The plaster board is designed to be delivered from the conveyor to a series of supporting idler rollers 26 spaced from the end of the conveyor, which rollers are free to revolve on shafts 27 extending transversely beneath the plane of travel of the plaster board and supported in suitable standards 28 carried on beams 29 forming part of a stationary frame 30.

Means are provided, operative from the conveyor mechanism, for assisting the advance of the plaster board as it passes from the rollers 26, which means is here shown as embodying a sprocket wheel 31 mounted on the shaft B and engaging a sprocket chain 33 passing around a sprocket wheel 34 on a shaft 35 extending transversely beneath the beams 29; the shaft 33 carrying a sprocket wheel 36 around which passes a sprocket chain 37 engaging a sprocket wheel 38 secured to a shaft 39 extending parallel to the shafts 27. Shaft 39 has rollers 40 fixed thereon which are arranged to bear against the under side of a length of plaster board 41 passing from the rollers 26.

Cooperating with the rollers 40 are spaced sets of rollers 42 and 43 which are designed to be driven in unison with the rollers 40 through sprocket chains 44, 45 and 46; the sprocket chain 44 passing around a sprocket wheel 47 on the shaft 39 and around a sprocket wheel 48 on a shaft carrying the rollers 42. Sprocket chain 45 passes around a sprocket wheel 49 affixed to sprocket wheel 48 and also around a sprocket wheel 50 on a shaft carrying the rollers 43. Sprocket chain 46 passes around sprocket wheel 51 affixed to sprocket wheel 50 and leads to other sprocket wheels for operating sets of carrying rollers as shown in Figure 9. The rollers 40, 42 and 43 are driven at a greater lineal travel at their peripheries than the lineal travel of the belt 2 so as to tend to pull the end portion 41 of the plaster board strip and act to accelerate movement of a section of the plaster board when it is severed from the strip, as will be later described.

The means for effecting movement of the carriers 14 and 15 back and forth on the rails 16 and 17 embodies a sprocket wheel 52 fixed on the shaft B, a sprocket chain 53 passing around sprocket wheel 52 and around a sprocket wheel 54 fixed on a shaft 55. Shaft 55 is rotatably mounted in bearings 56 and 57 carried on the base members 22 and 23, and extends transversely beneath the rails 16 and 17. Pulleys 58 and 59 are fixed on the ends of shaft 55 around which pulleys belts 60 and 61 pass and lead around idler pulleys 62 and 63. A shaft 64 carrying the pulleys 62 and 63 is rotatably mounted in bearings 65 and 66 carried on the base members 22 and 23. The belts 60 and 61 extend horizontally with the upper leads thereof arranged adjacent to and parallel with the rails 16 and 17, with the upper and lower leads of the belts extending through the frames 24 and 25 on the carriers 14 and 15. The frames 24 and 25 carry a pair of vertically spaced rock shafts 67 and 68 which extend beneath the rails 16 and 17 and between the upper and lower leads in the belts 60 and 61. Fixed on the rock shaft 67, adjacent each of its ends and extending immediately below the upper leads of the belts 60 and 61, are eccentric cams 69, and fixed adjacent each end of the shaft 68 and arranged immediately above the lower lead of the belts 60 and 61 are eccentric cams 70. These cams are designed to be alternately thrown in and out of engagement with the upper and lower leads of the belts to connect the carriers, first to one lead of the belt, and then to the other lead, so that the carriers may be moved longitudinally of the rails with a reciprocal movement.

Means are provided on the frames 24 and 25, cooperating with the cams 69 and 70, as shown in Figure 8, for effecting engagement between the belts and the frames, which in the case of the cam 69 embodies a bracket 71 vertically adjustable on a member of the frame and held in place by bolts 72. The bracket carries a friction plate 73 secured to a flange 74 on the bracket 71; the plate 73 extending over the upper lead of the belt above the cam 69, so that on turning the cam into the position shown in Figure 8, the upper lead of the belt will be clamped between the cam and the plate 73. A plate 75 is carried on a horizontal member 76 of the frame and projects beneath the lower lead of the belt in such position that the cam 70 may be turned to engage the belt. The cams 69 and 70 are normally disposed so that when one of the cams engages the belt the other cam will be disengaged therefrom and are so arranged and operated that in advancing either of the cams to engage a belt there will be an interval when both cams are free of the belt to permit continued movement of the belts without effecting movement of the cams.

Projections 77 and 78 extend from the bottom side of the plate 75 to hold the latter against longitudinal movement transversely of the member 76. A bolt 79 threaded through the member 76 provides means for adjusting the plate 75 relative to the cam 70.

The shafts 67 and 68 extend through a side member 81 on the frame 25 and have fixed thereon levers 82 and 83, respectively. A rod 84 is pivotally connected to the upper arm 85 of the lever 82 by which the latter may be rocked, as will be later described. Formed on the lower end of the lever 82 is a yoke 86 which is pivotally connected to the upper arm 87 of lever 83 by a pin 88 which extends into a slot in yoke 86. The lower arm 89 of the lever 83 depends downwardly from the shaft 68.

The connected levers 82 and 83 are designed to be rocked to actuate the rock shafts 67 and 68 simultaneously, to throw the cams 69 and 70 alternately into engagement with the upper and lower leads of the belts or move the cams to a neutral position. A weight C on a stem D projecting from the lever 82 radially of the axis of rotation of the rock shaft 67, tends normally to retain the upper portion 85 of the lever 82 in a retracted position with the cam 70 out of engagement with the belt and to maintain the upper portion 87 of the lever 82 in an advanced position with the cam 70 engaged with the lower lead of the belts. The lower portion 89 of the arm 83 would then be in a retracted position and the parts would be disposed in positions opposite those shown in Figures 2, 6, and 8, in which the weight C is shown in its elevated position.

Means are provided controlled by the advancing end portion 41 of the plaster board for actuating the lever 85 and its connected parts in opposition to weight C so as to dispose the parts in the position shown in Figures 2, 6 and 8 and effect engagement between the cams 69 and the upper leads of the belts so that the carriers supporting the saw carriage will be advanced in unison with the plaster board; it being understood that the belts 60 and 61 travel at a speed corresponding to that of the advancing strip 1 of the plaster board. This means is here shown as embodying an inward extension 90 on the rod 84 which connects with a tubular rod 91 extending in a direction parallel to the rod 84 adjacent the edge of the plaster board; the rod 91 being slidably mounted in guide brackets 92 on the rail 29. The rod 91 is fitted with an extension rod 93 which telescopes rod 91 and is affixed thereto by means of a set screw 94, as particularly shown in Figure 7. The out end portion 95 of the extension rod 93 is slidably supported in a guide bracket 96 carried on the beam 29. Extending adjacent the rod 93 is an inclined rod 97 supported in brackets 98 and 99 on the beam 29; the rod 97 inclining downwardly in the direction of advance movement of the plaster board. Rotatably mounted on the rod 93 is a sleeve 100 carrying a fixed finger 101 having a lug 102 on its outer end, positioned, when the rod 93 is retracted, in the path of travel of the advancing end portion 41 of the plaster board, whereby advance movement of the plaster board will cause the rod 93 to advance and thereby advance lever 85 to connect the carrier with the upper leads of the carrier-operating belts 60 and 61, it being assumed that the carriers are in their retracted position at this time. The sleeve 100 is designed to be rocked by advance and retrograde movement of the rod 93, and for which purpose the sleeve 100 is fitted with a fixed finger 103 which extends downwardly beneath the inclined rod 97 in such fashion that as the rod 93 advances the finger 103 will be depressed to eventually swing the finger 101 and lug 102 thereon upwardly clear of the advancing end of the plaster board, as indicated in dotted lines E in Figure 7; the rod 97 serving on retrograde movement of the rod 93 to permit the finger 103 to ride upwardly as the rod 93 retracts, and cause finger 101 to move downwardly under the action of the weight of the lug 102, whereby when the rod 93 is wholly retracted, the finger and lug will be positioned in the path of the advancing end portion of the plaster board. The sleeve 100 is held against longitudinal movement on the rod 93 by adjustable stop collars 104 and 105 which are rigidly engaged with the shaft 93 by set screws 106. By loosening the set screws 106, the collars 104 and 105 with the sleeve 100 may be adjusted to various positions longitudinally of the shaft 93, which adjustment serves as a means to enable accurate gauging of the length of the plaster board section to be severed from the advancing strip of plaster board, the finger 101 being positioned on the rod 93 a measured distance from the carriers and the plaster board cutting mechanism carried by the latter with the carrier in its fully retracted position, according to the desired length of the plaster board section.

Referring now to Figures 1 and 2, 107 indicates a stop member mounted on the rail 23 arranged in the path of travel of the lever arm 85, as the latter advances with the carriers; and serves as the lever arm moves against this stop member, to rock the lever 82 to its normal retracted position after it has been released on the finger 101 being disengaged from the end of the plaster board section.

Arranged in the path of travel of the lower member 89 of the lever 83 are stop pins 108 and 109 fixed on a rigid support 110; the stop 108 serving on retrograde movement of the carriers to rock the lever 83 when the carriers reach their rearmost position, and the stop pin 109 acting to rock the lever 83 simultaneously with the operation of the lever 82 by the stop member 107 when the carriers reach their forwardmost position.

In order to permit manual operation of the levers 82 and 83 a handle F is formed on the lever arm 85 so that when desired, the clutch mechanism may be manually thrown into either of its positions.

Referring more particularly to Figures 1, 2, 4, and 5, showing the saw carriage, 114 and 115 indicate sheave boxes which are channel shaped and carry grooved rollers 116 and 117 which travel on tracks 7 and 8, respectively. The sheave boxes are connected together by frame members 119 and 120, and mounted on the sheave boxes are stepped brackets 121 and 122 on which is supported a motor 123. Mounted on the shaft of the motor 123 is a vertical disk cross cut saw 124 which extends in the direction of the travel of the saw carriage on the tracks 7 and 8, and has its lower portion projecting through slots 125 and 126 in the brackets 121 and 122, as shown in Figure 4, in such position as to pass through and sever a strip of plaster board extending immediately beneath the said brackets. A supporting bar 127, mounted on the carriers 14 and 15, is arranged to extend transversely beneath the plaster board opposite the saw 124 and has formed therein a longitudinal channel 128 into which the lower portion of the saw projects; the channel extending the full length of the saw travel which exceeds that of the width of the plaster board so that the saw may occupy a position clear of the longitudinal edges of the plaster board close to either edge thereof. The saw carriage is designed to be manually advanced or retracted on the tracks 7 and 8, for which purpose the carriage is fitted with a handle 129.

Means are provided for trimming the longitudinal edges of the plaster board, here shown as operating on a plaster board section after it has been severed from the strip; this trimming means being particularly shown in Figures 9, 10 and 11. The trimming means embodies a pair of parallel endless conveyor chains 130 and 131 fitted with stops 132 and which chains pass around sprocket wheels 133 and 134 mounted on a shaft G which may be driven from any suitable source of power. The sprocket chains 130 and 131 lead from the sprocket wheels 133 and 134 around other sprocket wheels, not shown. The sprocket wheels 133 and 134 are arranged adjacent the driven rollers 43 and extend in line with the direction of travel of the plaster board, and are operated in such manner that when the plaster board is ejected from the rollers 43 its rear edge will be engaged by the stops 132 so that the board will be advanced by the chain and carried between spring tensioned guide members 135 carried by the beams 29. The guide members act to align and center the plaster board section on the conveyor chains 130 and 131.

Journaled in suitable bearings 136 is a shaft 137 which extends horizontally beneath the plane of the plaster board and has fixed thereon a pair of disk rip saws 138 and 139 arranged to trim the edges of the plaster board as it is advanced by the conveyor chains and as it leaves the guide members 135. A supporting panel 140 extends transversely beneath the plaster board over the shaft 137, as particularly shown in Figure 11, and is formed with slots 141 through which the upper portions of the saws 138 and 139 extend. Protecting plates 142 carried by the beams 29 project over the edges of the plaster board above the supporting panel 140 and are formed with slots 143 through which the saws 138 and 139 extend; the protecting plates serving to prevent the plaster board from riding the saws 138 and 139. The saw shaft 137 is driven by a motor 144 through the medium of a belt 145.

In the operation of the invention the strip of plaster board 1 is advanced by the conveyor 2 over a guide roller 26ª beneath the saw carriage and over the supporting bar 127 on the carriers; the carriers then being located in their retracted position and maintained stationary by reason of the cam clutch members 69 and 70 being held out of engagement with the belts 60 and 61; the lever arm 89 having been lifted slightly by moving in contact with the pin 108 to dispose the cams in neutral. It will be understood that the carriers in moving to their retracted position will have caused the lever arm 89 to ride onto the pin 108 and thereby rock the connected levers 83 and 82 in opposition to the weight C and to turn the rock shafts 67 and 68 such distance as to move the cams 69 and 70 to a neutral inoperative position so that the belts 60 and 61 may travel continuously without effecting movement of the carrier. The plaster board after passing under the saw carriage is advanced so as to pass onto and over the supporting rollers 26 and onto the rollers 40, 42 and 43. The end of the plaster board after passing over the rollers 42, engages the finger 101 and operates to move the rod 93 so as to pull the lever arm 85 forwardly and thereby rock the rock shaft 67 such distance as to cause the cam 69 to clamp the upper lead of the belt 61 against the plate 63, thus frictionally connecting the carriage to the belt.

The upper lead of the belt 61 traveling in the direction of movement of the plaster board and at a corresponding speed with the latter, the carriers and the saw carriage will be advanced in unison with the board. During this advance movement of the carriers the saw carriage is moved transversely of the plaster board on the tracks 7 and 8 so as to cause the driven saw 124 to sever the length of plaster board 41 from the plaster board strip. This movement of the saw carriage may be effected manually, as before described, and may be made at any time during advance movement of the carriers, so that the board will be severed before the carriers reach their forwardmost position. The advancing plaster board, in causing the rod 93 to advance, also causes the arm 103 on sleeve 100 to travel downward on the inclined rod 97 which acts to eventually swing the finger 101 clear of the edge of the plaster board, whereupon the plaster board will travel beneath the finger and will be caused to advance with an accelerated movement to the rollers 43 by action of the rollers 40 and 42, the rollers 40, 42, and 43 then cooperating to move the severed length of plaster board onto the carrier chains 130—131, by which the board is passed between the trimming saws 138 and 139. In this manner sections of plaster board 41 may be cut of uniform lengths and breadths. As the carriers are moved to their advanced position by the belts 60 and 61, the stops 107 and 109 act on the levers 82 and 83 as before described; the lever arm 85 being moved rearwardly and thereby retracting the shaft 93 and the finger 101 thereon which retraction of the shaft 93 causes the arm 103 to move upwardly under the rod 97, thus allowing the finger 101 to drop downwardly into the plane of travel of the succeeding plaster board section. The operation of the levers 82 and 83 by the stops 107 and 109 acts to turn the rock shafts 67 and 68 so as to throw the cams 69 out of engagement with the upper leads of the belts and move the cams 70 into engagement with the lower lead of the belts. This effects an engagement between the carriers and the lower leads of the belts which travel in a direction opposite that of the advancing plaster board and acts to retract the carriers to the normal starting position where the carriers are stopped by action of the lever arm 89 riding on to pin 108, as before described.

In operating the saw carriage, it is advanced across the plaster board in one direction in effecting a cut, and when the saw is clear of the plaster board it is permitted to come to rest with the saw disposed adjacent the longitudinal edge of the board but spaced therefrom so that the carriers may be retracted. In making the next cut of the board the saw carriage is moved in the opposite direction and brought to rest with the saw disposed adjacent the other edge of the board in readiness for another operation.

While I have described an apparatus in a specific form I do not limit myself to the exact details shown, therefore, various changes may be made to produce the desired result without departing from the spirit of my invention as claimed.

I claim:

1. In a machine for cutting plaster board, means for cutting a strip of plaster board into lengths while in motion, means for feeding the plaster board to the cutting means, means whereby said means for cutting the plaster board into lengths will be caused to move at the same speed at which the plaster board is traveling which includes an element engaging the front edge of the advancing plaster board, and means for accelerating movement of a length of plaster board severed from the main body of said plaster board to permit said element to engage with the front edge of said board.

2. A machine of the class described, comprising means for cutting plaster-board into lengths and trimming the same while in motion, an endless conveyor for supporting and feeding plaster-board to the cutting means, means whereby said means for cutting the plaster board into lengths will move at the same rate of speed at which the plaster-board is traveling which includes an element engaging the front edge of the advancing board and power driven rollers for accelerating movement of a length of plaster-board severed from the main body of said plaster-board to permit said element to engage with the front edge of said board, and means adapted to trim the longitudinal edges of said severed length of plaster-board to which the plaster board is advanced by said power driven rollers.

3. In a machine for cutting plaster board, means for advancing a strip of plaster board, carriers mounted to travel longitudinally of the plaster board, tracks supported by said carriers extending transversely of the plaster board, a saw carriage mounted to travel in said tracks, a saw mounted on said saw carriage adapted to sever the plaster board on moving the saw carriage transversely of the plaster board, endless belts having oppositely traveling leads extending longitudinally of the plaster board, a clamp on said carriers engageable with one lead of the belt, a second clamp on the carrier engageable with the other lead of the belt, and means controlled by advance movement of the plaster board for throwing said clamps alternately in and out of engagement with the oppositely traveling leads of said belt whereby said carriers will be caused to have a reciprocal movement longitudinally of the plaster board.

4. In a machine for cutting plaster board, means for advancing a strip of plaster board, a carrier mounted to travel longitudinally of said board, means on said carrier adapted to sever the board transversely thereof, an endless belt having oppositely traveling leads extending longitudinally of the belt, a frame on said carrier extending adjacent said belt, shoes on said frame projecting adjacent the faces of the leads of the belt, means on said frame cooperating with said shoes for frictionally engaging the leads of the belt and so arranged that when one of the leads is engaged the other will be disengaged, and whereby the carrier may be advanced and retracted longitudinally of the plaster board, and means operable by the advancing plaster board whereby one lead of the belt will be engaged to effect movement of the carrier in the direction of travel of the plaster board, and means operable by movement of the carrier for releasing the advancing lead of the belt and engaging the retracting lead thereof.

5. In a machine for cutting plaster board, means for advancing a strip of plaster board, a stop arranged to be engaged by the front edge of the advancing plaster board and be impelled thereby, a longitudinally slidable rod upon which said stop is pivotally mounted, a clutch controlled by said rod, an inclined rod, and an arm on said pivoted stop engaged by said inclined rod so as to be tilted thereby out of engagement with the plaster board by its movement therewith.

6. In a plaster board cutting machine, means for advancing a strip of plaster board, a carrier mounted to travel longitudinally of said board, means on said carrier operable to sever the board transversely, means for advancing said carrier longitudinally of the board, normally out of operative relation thereto, a stop normally projecting in the path of travel of the plaster board, means operable by the engagement of said stop by the plaster board for effecting engagement between the carrier and its moving means whereby the carrier will be caused to advance in unison with the plaster board in the direction of travel of the latter, means whereby said stop will be caused to advance with the plaster board, and means operable by advance of the stop for throwing it out of engagement with said plaster board.

7. In a plaster board cutting machine, means for advancing a strip of plaster board, a carrier mounted to travel longitudinally of said board, means on said carrier operable to sever the board transversely, means for advancing said carrier longitudinally of the board, normally out of operative relation thereto, a stop normally projecting in the path of travel of the plaster board, means operable by the engagement of said stop by the plaster board for effecting engagement between the carrier and its moving means whereby the carrier will be caused to advance in unison with the plaster board in the direction of travel of the latter, said stop being caused to advance with the plaster board, means operable by advance of the stop for throwing it out of engagement with said plaster board, and means operable by movement of the carrier for restoring said stop into operative relation to the advancing end of the plaster board.

8. In a machine for cutting plaster board, means for advancing a strip of plaster board, means for severing the plaster board transversely, means for advancing the severing means in unison with the plaster board, and means engageable with the front edge of the advancing board cooperating with the means for advancing the severing means to cause said severing means to advance with the board a predetermined distance from the front edge of the board.

GEORGE A. BUTTRESS.